(12) United States Patent
Short et al.

(10) Patent No.: US 7,580,853 B2
(45) Date of Patent: Aug. 25, 2009

(54) METHODS OF PROVIDING A MARKETING GUIDANCE REPORT FOR A PROPOSED ELECTRONIC GAME

(75) Inventors: Gregory T. Short, San Bernardino, CA (US); Geoffrey C. Zatkin, Encinitas, CA (US); David W. Fay, San Diego, CA (US)

(73) Assignee: Electronic Entertainment Design and Research, San Diego, CA (US)

( * ) Notice: Subject to any disclaimer, the term of this patent is extended or adjusted under 35 U.S.C. 154(b) by 0 days.

(21) Appl. No.: 11/734,998

(22) Filed: Apr. 13, 2007

(65) Prior Publication Data

US 2007/0244742 A1    Oct. 18, 2007

Related U.S. Application Data

(60) Provisional application No. 60/792,916, filed on Apr. 17, 2006, provisional application No. 60/792,915, filed on Apr. 17, 2006.

(51) Int. Cl.
*G06F 17/30* (2006.01)
(52) U.S. Cl. .......................................... 705/10
(58) Field of Classification Search ................... 705/10
See application file for complete search history.

(56) References Cited

U.S. PATENT DOCUMENTS

| | | | |
|---|---|---|---|
| 6,826,541 B1 | 11/2004 | Johnston et al. | |
| 6,862,574 B1 | 3/2005 | Srikant et al. | |
| 6,910,017 B1 | 6/2005 | Woo et al. | |
| 6,937,913 B2 | 8/2005 | Nishikawa et al. | |
| 7,349,838 B2 * | 3/2008 | Summers | 703/22 |
| 2003/0003988 A1 * | 1/2003 | Walker et al. | 463/21 |
| 2003/0065978 A1 | 4/2003 | Adams | |
| 2004/0005919 A1 * | 1/2004 | Walker et al. | 463/23 |
| 2004/0024666 A1 * | 2/2004 | Walker et al. | 705/32 |
| 2004/0259631 A1 * | 12/2004 | Katz et al. | 463/25 |
| 2006/0212337 A1 * | 9/2006 | Vayghan et al. | 705/10 |
| 2006/0235783 A1 * | 10/2006 | Ryles et al. | 705/35 |

(Continued)

FOREIGN PATENT DOCUMENTS

WO    WO 2007001889 A2 *    1/2007

OTHER PUBLICATIONS

Shang Hwa Hsu, Feng-Liang Lee, Muh-Cherng Wu. CyberPsychology & Behavior. 2005, 8(6): 585-591.*

(Continued)

*Primary Examiner*—Scott L Jarrett
(74) *Attorney, Agent, or Firm*—Fish & Associates, PC

(57) ABSTRACT

Features of electronically embodied games are logically categorized, analyzed, and compared. Features are preferably organized according to a hierarchical classification scheme, according to a classification scheme that is not strictly tautological. All suitable feature sets are contemplated, including sets corresponding to characteristics of players and non-players, types and/or uses of game space, methods of rewarding a player, etc. In other aspects comparisons are made between an evaluation game and one or more sets of historically available games. Such sets can be grouped by genre and the number of games in such sets can range anywhere from a single game to hundreds of games, or more. Reporting and guidance can include providing a risk assessment score or other risk analysis, feature assessment (prevalence), market placement, business model analysis, dynamic trend analysis, clustered pattern recognition, and image analysis.

17 Claims, 19 Drawing Sheets

U.S. PATENT DOCUMENTS

| | | | | |
|---|---|---|---|---|
| 2008/0004938 | A1* | 1/2008 | Maerz | 705/10 |
| 2008/0065471 | A1* | 3/2008 | Reynolds et al. | 705/10 |
| 2008/0085768 | A1* | 4/2008 | Park | 463/40 |

OTHER PUBLICATIONS

Pederson, Roger E. Game Design Foundations. Plano, Tex: Wordware, 2002, pp. 19-23 and 51-54.*

Williams, D. (2002). Structure and Competition in the U.S. Home Video Game Industry. The International Journal on Media Management, 4(1), 41-54.*

David Callele, Eric Neufeld, Kevin Schneider, "Requirements Engineering and the Creative Process in the Video Game Industry," re , pp. 240-252, 2005.*

Grantham, A. and R. Kaplinsky (2005). 'Getting the Measure of the Electronic Games Industry: Developers and the Management of Innovation'. International Journal of Innovation Management, 9, 2, pp. 183-213.*

Dongseong Choi, Jinwoo Kim. CyberPsychology & Behavior. 2004, 7(1): 11-24.*

Gallagher, S.; Seung Ho Park, "Innovation and competition in standard-based industries: a historical analysis of the US home video game market," Engineering Management, IEEE Transactions on , vol. 49, No. 1, pp. 67-82, Feb. 2002.*

Irish, Dan The Game Producer's Handbook. Course Technology: 2005 [downloaded excerpt only from Safari Books Online, Nov. 24, 2007], 7 pages total including front matter.*

Walker, Mark. Games That Sell! Wordware Publishing, Inc. Jun. 25, 2003, pp. 7 and 15. Retrieved from Amazon.com book previews on Jan. 14, 2008.*

DFC Intelligence. The Business of Computer and Video Games. DFC Intelligence, Mar. 2004, Table of Contents (only). Retrieved from www.dfcint.com on Jan. 14, 2008.*

Konzack, Lars. "Computer Game Criticism: A Method for Computer Game Analysis", in CGDC Conference Proceedings, Frans Mayra (ed.), Tampere University Press 2002, pp. 89-100. Retrieved from <url: http://imv.au.dk/~konzack/tampere2002.pdf> on Jan. 14, 2008.*

Consalvo, Mia & Dutton, Nathan. (2006). Game analysis: Developing a methodological toolkit for the qualitative study of games. Game Studies 6 (1). Retrieved from <url: http://gamestudies.org/06010601/articles/consalvo_dutton> on Jan. 14, 2008.*

Aarseth, Espen J. Playing Research: Methodological approaches to game analysis, Melbourne DAC—the 5th International Digital Arts and Culture Conference, School of Applied Communication, Melbourne, 2003, pp. 1-7. Retrieved from <url: http://spilforskning.dk/gameapproaches/GameApproaches2.pdf> on Jan. 14, 2008.*

Ip, Barry and Jacobs, Gabriel. Quantifying game design. Design Studies, vol. 25, Issue 6, Nov. 2004, pp. 607-624. Retrieved online from ScienceDirect <url: doi:10.1016/j.destud.2004.02.001> on Jan. 14, 2008.*

Garneau, Pierre-Alexandre. The 10 Minutes Game Sales Potential Test. Gamasutra [online], Feb. 12, 2007. Retrieved from <url: http://www.gamasutra.com/features/20070212/garneau_01.shtml> on Jan. 14, 2008.*

Brand, Jeffrey E. et al., The diverse worlds project: narrative, style, characters and physical world in popular computer and video games, Humanities & Social Sciences papers, 2003.*

Pasichnyk, Roman et al., Modeling of Products Sale Velocity and Products Recommended Structure on the Basis of a Data Reduction Method, Internatinoal Workshop on Intelligent Data Acquisition and Advanced Computer Systems, Jul. 1-4, 2001.*

Thomas, Jerry, New Product Sales Forecasting Decision Analyst, Inc. 2006.*

Ip, Barry et al., Quantifying Game Design Design Studies, vol. 25, 2004.*

Matsatsinis, Nikolas et al., MARKEX: An intelligent decision support system for product development decisions European Journal of Operational Research, vol. 113, 1999.*

Eliashberg, Jehoshua et al., MOVIEMOD: An implementable decision-support system for prerelease market eval . . . Marketing Science, Summer 2000, vol. 19, No. 3.*

Regional Lockout—Wikipedia definition Retrieved from Wikipedia. org Mar. 31, 2009.*

Blattberg, Robert et al., Tracker: An early test market forecasting and diagnositc model for new produc . . . Journal of Marketing Research, May 1978, vol. 15 No. 2.*

* cited by examiner

Classification & Technical Specifications
    Branding
        Branding
        Celebrity Presence
    Classifications
        Content Rating
        Genre
    Distribution, Revenue & Medium
        Copy Protection
        Distribution & Revenue Model
        Game Medium (Media)
        Game Package Appearance
        Game Package Contents
        Pre-Registration Benefits
    Game Defining Characteristics
        Art Style
        Camera Perspective / Point of View
        Display Screen(s)
        Display Resolution
        Game Speed & Pausing
        Multiplayer Capability
    Hardware & Software
        Game Engine & Middleware
        Hardware Specifications
        Input Device(s)
        Physics Engine
        Platform
    Online
        Internet & Wireless Requirement
        Online Game Service Content Manager
        Website
NPC & Player Personification

Camera Perspective / Point of View
    Perspective consistency
        Single camera perspective
        Changing camera perspective
            Quantity of camera perspectives
                1
                2
                3
                4
                5
                6
        Perspective change is controlled by
            Game controls the change
            Player controls the change (toggle)
    Dominant camera perspective(s)
        Perspective types
            First person perspective
            Second person perspective
            Third person perspective
                Over the shoulder follow camera (follow cam)
                Platform
                Fixed camera locations
            Top down perspective
                Top down, fixed
                Top down, scroller
            Isometric prospective
            Side view perspective
                Side, fixed
                Side, scroller
        Perspective association
            General gameplay
            Combat
            Management
            Mini game
            Non-Combat
            Object use (camera, drone, turret, etc.)
            Puzzle
            Strategic
            Vehicle

| | |
|---|---|
| Platform: | Xbox |
| Genre: | Shooter |
| ESRB Rating: | Mature |
| ESRB Content Descriptors: | Blood and Gore<br>Violence |
| Primary Distribution: | Retail purchase / Physical store |
| Distribution Media: | DVD (1) |
| Branding: | Video game characters: New<br>Video game title: New<br>Video game universe: New |
| Input Devices: | Require: Control pad / game pad<br>Optional: Control pad / game pad with force feedback |
| Internet Requirement: | None |
| Multiplayer Support: | Number of synchronous players: Up to 16<br>Multiplayer connection: LAN (no online/internet)<br>Multiplayer architecture: Single host machine / peer to peer<br>Multiplayer display: Split screen (maximum 4)<br>Multiplayer gameplay: Campaign (entire game) & skirmish |
| Camera Perspective: | Number of camera perspectives: 2<br>Perspective change is controlled by: Game<br>Dominant perspective: $1^{st}$ person / association: combat<br>Second perspective: $3^{rd}$ person / association: vehicle |
| Display Screen(s): | Single screen |
| Display Resolution: | Default resolution: 640 x 480<br>Color depth: millions<br>Aspect ration: 4:3<br>Format: Normal |
| Game Speed: | Game Speed: Real Time<br>Combat Speed: Real time<br>Pause: Accessible single & multi player |

| Game Feature | Game Risk Index | Ave Risk Index by Genre | Ave Risk Index by Industry | Ave Risk Index by Filter X* |
|---|---|---|---|---|
| Game Feature Set 1 | 203/1000 | 403/1000 | 500/1000 | 253/1000 |
| Game Feature Set 2 | 431/1000 | 430/1000 | 500/1000 | 481/1000 |
| Game Feature Set 3 | 643/1000 | 540/1000 | 500/1000 | 610/1000 |
| Game Feature Set 4 | 567/1000 | 527/1000 | 500/1000 | 527/1000 |
| Game Feature Set 5 | 678/1000 | 408/1000 | 500/1000 | 690/1000 |
| Game Feature Set 6 | 658/1000 | 438/1000 | 500/1000 | 599/1000 |
| Game Feature Set 7 | 346/1000 | 496/1000 | 500/1000 | 380/1000 |
| Game Feature Set 8 | 470/1000 | 579/1000 | 500/1000 | 490/1000 |
| Total Risk | 487/1000 | 490/1000 | 500/1000 | 475/1000 |

* Filtered by feature X, such as games grossing over $1,000,000, release date, etc.

| Game Feature | Genre 1 | Genre 2 | Genre 3 | Genre 4 | Genre 5 | Genre 6 | Genre 7 | Genre 8 |
|---|---|---|---|---|---|---|---|---|
| Game Feature Set 1 | 20% | 20% | 40% | 20% | 20% | 70% | 40% | 20% |
| Game Feature Set 2 | 30% | 30% | 50% | 30% | 30% | 80% | 50% | 30% |
| Game Feature Set 3 | 20% | 40% | 60% | 40% | 20% | 90% | 60% | 20% |
| Game Feature Set 4 | 20% | 20% | 50% | 20% | 20% | 80% | 50% | 20% |
| Game Feature Set 5 | 30% | 30% | 60% | 30% | 30% | 90% | 60% | 30% |
| Game Feature Set 6 | 20% | 40% | 40% | 40% | 20% | 70% | 40% | 20% |
| Game Feature Set 7 | 20% | 20% | 50% | 20% | 20% | 80% | 50% | 20% |
| Game Feature Set 8 | 30% | 30% | 60% | 30% | 30% | 90% | 60% | 30% |
| Genre Match | 23% | 29% | 51% | 29% | 23% | 81% | 51% | 23% |

Secondary Match — Primary Match — Secondary Match

| Game Feature | Business Model 1 | Business Model 2 | Business Model 3 | Business Model 4 | Business Model 5 | Business Model 6 |
|---|---|---|---|---|---|---|
| Game Feature Set 1 | 20% | 20% | 40% | 20% | 20% | 70% |
| Game Feature Set 2 | 30% | 30% | 50% | 30% | 30% | 80% |
| Game Feature Set 3 | 20% | 40% | 60% | 40% | 20% | 90% |
| Game Feature Set 4 | 20% | 20% | 50% | 20% | 20% | 80% |
| Game Feature Set 5 | 30% | 30% | 60% | 30% | 30% | 90% |
| Game Feature Set 6 | 20% | 40% | 40% | 40% | 20% | 70% |
| Game Feature Set 7 | 20% | 20% | 50% | 20% | 20% | 80% |
| Game Feature Set 8 | 30% | 30% | 60% | 30% | 30% | 90% |
| Genre Match | 23% | 29% | 51% | 29% | 23% | 81% |

Game Features recommend Business Model                    Secondary Match                    Primary Match

Business Model 3

| Recommended Game Features | Non-Recommended Game Features |
|---|---|
| Game Feature 00129 | Game Feature 00421 |
| Game Feature 01123 | Game Feature 01522 |
| Game Feature 02720 | Game Feature 03820 |
| Game Feature 03125 | Game Feature 03422 |
| Game Feature 04620 | Game Feature 04920 |
| Game Feature 05120 | Game Feature 05623 |
| Game Feature 05420 | Game Feature 05420 |
| Game Feature 06126 | Game Feature 06225 |
| Game Feature 07120 | Game Feature 07520 |
| Game Feature 07320 | Game Feature 08726 |
| Game Feature 09122 | Game Feature 09222 |
| Game Feature 10120 | Game Feature 11420 |
| Game Feature 11139 | Game Feature 11639 |

Business Model recommends Game Features

|      | A | B | C | D | E | F | G | H |
|------|---|---|---|---|---|---|---|---|
| 1995 | X | X | X |   |   |   |   |   |
| 1996 |   | X | X | X |   |   |   |   |
| 1997 |   | X |   | X | X |   |   |   |
| 1998 | X |   |   | X | X | X |   |   |
| 1999 |   | X | X |   |   | X |   |   |
| 2000 |   |   | X | X |   | X | X |   |
| 2001 |   | X |   | X | X |   | X |   |
| 2002 |   |   | X | X |   |   | X | X |

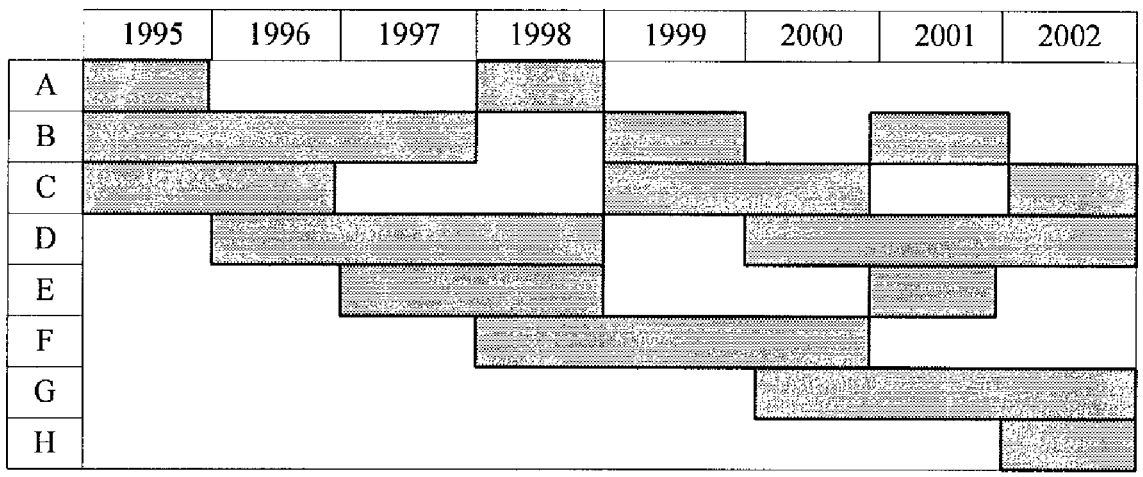

| A | Obtaining Item Unlocks Locked Doors |
|---|---|
| B | Completing Puzzle Unlocks Locked Doors |
| C | Defeating Mini-Boss Unlocks Locked Doors |
| D | Defeating Multiple Bosses Unlocks Locked Doors |
| E | Level Requirement Unlocks Locked Doors |
| F | Dying Locks All Unlocked Doors |
| G | Cannot Save Game While Door Is Locked |
| H | Cannot Save Game While Door Is Unlocked |

Figure 6E

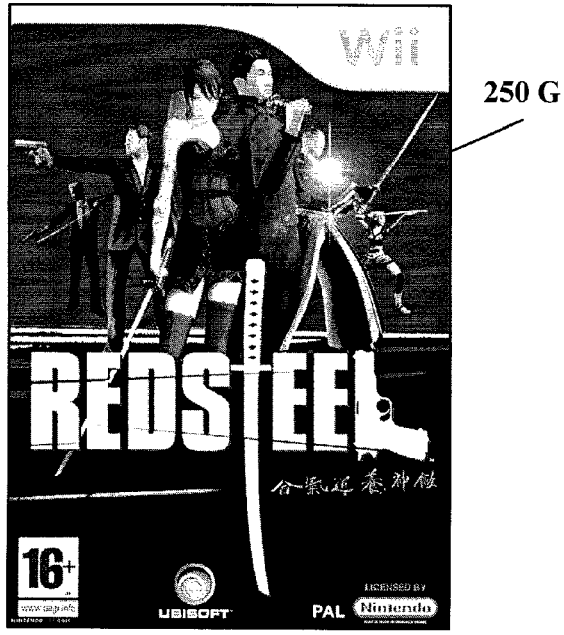

250 G

| COLORS PRESENT | RED (FF0000) 53%; BLACK (000000) 41%; WHITE (FFFFFF) 8%; OTHER 2% |
|---|---|
| TITLE PLACEMENT | START-Y: 60%; END-Y: 70%; START-X: 5%; END-X: 5% |
| TITLE COLORS | WHITE (FF0000): 98%; RED (FF0000) 2% |
| TITLE CONSUMPTION | 15.8% |
| TITLE PROPERTIES | INCORPORATES SWORD; INCORPORATES GUN; SHADOW: RED; LINES: RED, BLACK |
| RATING PLACEMENT | START-Y: 93%; END-Y: 98%; START-X: 2%; END-X: 7.5% |
| RATING CONSUMPTION | 2.3% |
| DEVELOPER PLACEMENT | START-Y: 95%; END-Y: 98%; START-X: 40%; END-X: 49.5% |
| DEVELOPER CONSUMPTION | 1.4% |
| BRAND PLACEMENT | START-Y: 2%; END-Y: 10%; START-X: 90%; END-X: 96% |
| BRAND CONSUMPTION | 6.4% |
| KEY ART IMAGE | ASIAN MALE, ASIAN FEMALE, SWORD COMBAT, GUN COMBAT |
| KEY ART CONSUMPTION | 53% |
| KEY ART PROPERTIES | COLOR COMBINATIONS:  RED (FF0000) / BLACK (000000)<br>RED (FF0000) / WHITE (FFFFFF)<br>WHITE (FF0000) / BLACK (000000)<br>BLACK (000000) / BROWN (BC8F8F) |

Figure 6G

| Game Feature | Genre 1 Valuation | Genre 2 Valuation | Genre 3 Valuation | Genre 4 Valuation | Genre 5 Valuation |
|---|---|---|---|---|---|
| Game Feature 1 | $ 40k | $ 50k | $ 30k | $ 45k | $ 90k |
| Game Feature 2 | $ 80k | $ 40k | $ 80k | $ 100k | $ 120k |
| Game Feature 3 | $ 10k | $ 5k | $ 20k | $ 10k | $ 50k |
| Game Feature 4 | $ 100k | $ 90k | $ 140k | $ 100k | $ 40k |
| Game Feature Set 1 | $ 25k | $ 55k | $ 35k | $ 25k | $ 95k |
| Game Feature Set 2 | $ 85k | $ 135k | $ 75k | $ 70k | $ 35k |
| Game Feature Set 3 | $ 150k | $ 140k | $ 190k | $ 100k | $ 50k |
| Game Feature Set 4 | $ 220k | $ 160k | $ 320k | $ 200k | $ 120k |
| Etc. | | | | | |

| Most Common Genre Features | Feature | Prevalence |
|---|---|---|
| Game environments | No factory environments | 86.67 % |
| Internet & Wireless Requirement: | No required internet connection speed | 80.00 % |
| Multiplayer Connection | No internet (online) capability | 80.00 % |
| During transition appearance (splash screen): | No loading bar during transitions | 73.33 % |
| Internet & Wireless Requirement: | No optional online requirements | 73.33 % |
| Multiplayer Architecture: | No client / server multiplayer architecture | 73.33 % |
| Structure destruction: | Structures do not display damage / damage effects | 73.33 % |
| Environment navigation / Compass | No compass | 66.67 % |
| Camera Perspective / Point of View: | Single perspective (has 2 base camera perspectives) | 66.67 % |
| Game environments: | No city/urban industrial environments | 60.00 % |
| Hardware: Optional input devices: | Does not use a microphone | 53.33 % |
| Multiplayer Architecture: | No client / server matchmaking | 53.33 % |
| Display Resolution: | No HDTV Support | 50.00 % |
| Display Resolution: | No HDTV Support 480p, 720p, 1080i | 50.00 % |
| Game Engine: | Does not use licensed technology for game engine | 50.00 % |

Figure 8A

| Features | Genre 1 | Genre 2 | Genre 3 | Genre 4 | Genre 5 | Genre 6 | Genre 7 | Genre 8 |
|---|---|---|---|---|---|---|---|---|
| Feature Set 1 | 20% | 20% | 40% | 20% | 20% | 70% | 40% | 20% |
| Feature Set 2 | 30% | 30% | 50% | 30% | 30% | 80% | 50% | 30% |
| Feature Set 3 | 20% | 40% | 60% | 40% | 20% | 90% | 60% | 20% |
| Feature Set 4 | 20% | 20% | 50% | 20% | 20% | 80% | 50% | 20% |
| Feature Set 5 | 30% | 30% | 60% | 30% | 30% | 90% | 60% | 30% |
| Feature Set 6 | 20% | 40% | 40% | 40% | 20% | 70% | 40% | 20% |
| Feature Set 7 | 20% | 20% | 50% | 20% | 20% | 80% | 50% | 20% |
| Feature Set 8 | 30% | 30% | 60% | 30% | 30% | 90% | 60% | 30% |
| Genre Match | 23% | 29% | 51% | 29% | 23% | 81% | 51% | 23% |

Figure 8B

| Game Features | Business Model 1 | Business Model 2 | Business Model 3 | Business Model 4 | Business Model 5 | Business Model 6 |
|---|---|---|---|---|---|---|
| Game Feature Set 1 | 20% | 20% | 40% | 20% | 20% | 70% |
| Game Feature Set 2 | 30% | 30% | 50% | 30% | 30% | 80% |
| Game Feature Set 3 | 20% | 40% | 60% | 40% | 20% | 90% |
| Game Feature Set 4 | 20% | 20% | 50% | 20% | 20% | 80% |
| Game Feature Set 5 | 30% | 30% | 60% | 30% | 30% | 90% |
| Game Feature Set 6 | 20% | 40% | 40% | 40% | 20% | 70% |
| Game Feature Set 7 | 20% | 20% | 50% | 20% | 20% | 80% |
| Game Feature Set 8 | 30% | 30% | 60% | 30% | 30% | 90% |
| Genre Match | 23% | 29% | 51% | 29% | 23% | 81% |
| Game Features recommend Business Model | | | Secondary Match | | | Primary Match |

Business Model 3

| Recommended Game Features | Non-Recommended Game Features |
|---|---|
| Game Feature 00129 | Game Feature 00421 |
| Game Feature 01123 | Game Feature 01522 |
| Game Feature 02720 | Game Feature 03820 |
| Game Feature 03125 | Game Feature 03422 |
| Game Feature 04620 | Game Feature 04920 |
| Game Feature 05120 | Game Feature 05623 |
| Game Feature 05420 | Game Feature 05420 |
| Game Feature 06126 | Game Feature 06225 |
| Game Feature 07120 | Game Feature 07520 |
| Game Feature 07320 | Game Feature 08726 |
| Game Feature 09122 | Game Feature 09222 |
| Game Feature 10120 | Game Feature 11420 |
| Game Feature 11139 | Game Feature 11639 |

Business Model recommends Game Features

Figure 8C

|      | A | B | C | D | E | F | G | H |
|------|---|---|---|---|---|---|---|---|
| 1995 | X | X | X |   |   |   |   |   |
| 1996 |   | X | X | X |   |   |   |   |
| 1997 |   | X |   | X | X |   |   |   |
| 1998 | X |   |   | X | X | X |   |   |
| 1999 |   | X | X |   |   | X |   |   |
| 2000 |   |   | X | X |   | X | X |   |
| 2001 |   | X |   | X | X |   | X |   |
| 2002 |   |   | X | X |   |   | X | X |

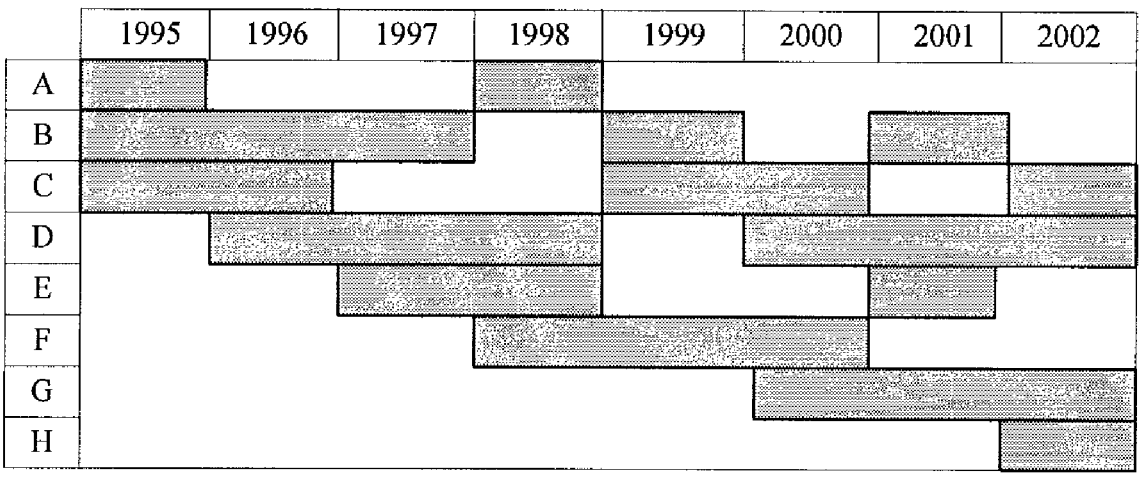

| A | Obtaining Item Unlocks Locked Doors |
|---|---|
| B | Completing Puzzle Unlocks Locked Doors |
| C | Defeating Mini-Boss Unlocks Locked Doors |
| D | Defeating Multiple Bosses Unlocks Locked Doors |
| E | Level Requirement Unlocks Locked Doors |
| F | Dying Locks All Unlocked Doors |
| G | Cannot Save Game While Door Is Locked |
| H | Cannot Save Game While Door Is Unlocked |

Figure 8D

| Game Feature | Genre 1 Valuation | Genre 2 Valuation | Genre 3 Valuation | Genre 4 Valuation | Genre 5 Valuation |
|---|---|---|---|---|---|
| Game Feature 1 | $ 40k | $ 50k | $ 30k | $ 45k | $ 90k |
| Game Feature 2 | $ 80k | $ 40k | $ 80k | $ 100k | $ 120k |
| Game Feature 3 | $ 10k | $ 5k | $ 20k | $ 10k | $ 50k |
| Game Feature 4 | $ 100k | $ 90k | $ 140k | $ 100k | $ 40k |
| Game Feature Set 1 | $ 25k | $ 55k | $ 35k | $ 25k | $ 95k |
| Game Feature Set 2 | $ 85k | $ 135k | $ 75k | $ 70k | $ 35k |
| Game Feature Set 3 | $ 150k | $ 140k | $ 190k | $ 100k | $ 50k |
| Game Feature Set 4 Etc. | $ 220k | $ 160k | $ 320k | $ 200k | $ 120k |

METHODS OF PROVIDING A MARKETING GUIDANCE REPORT FOR A PROPOSED ELECTRONIC GAME

This application claims priority to provisional application Ser. Nos. 60/792,915 filed on Apr. 17, 2006, and 60/792,916 filed on Apr. 17, 2006.

FIELD OF THE INVENTION

The field of the invention is electronic games.

BACKGROUND

All games, including video games, comprise sets of rules. Such rule sets define every-thing from the visuals of the environment, to the means by which a person or object moves through such an environment, manipulates that object or environment and, eventually, completes the game.

Significantly, no system has been developed for logically analyzing and comparing video games on a feature by feature basis. In fact, such analysis has not even been possible because a standard nomenclature for features of video game features has not been established. It is true that games are routinely classified into genres, (e.g., Action, Fighting, Role-playing, Massively Multiplayer Online, Platform, Simulation, Sports, and Strategy), and are also routinely classified according to their age and skill levels. But such classifications are subjective, and there appears to be no rigorous logical system for mapping between feature sets and game classifications.

The closest prior art seems to be U.S. Publication No.: 2003/0065978 (parameterizing errors of a software product already released to the public), U.S. Pat. No. 6,937,913 (parameterizing features of products that customers say they want or need), and U.S. Pat. No. 6,826,541 (applying a heuristic to criteria identifiers of products). These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Many problems in the video game design process result from this absence of systems and methods for logically analyzing and comparing video games on a feature by feature basis. For example, game production is often hindered because genre-standard features are often forgotten or are remembered late in the design process, only to be hastily implemented at the last minute. On the flip side of the coin, non-standard features are often given undo emphasis and allotted a disproportionate amount of development resources. Additionally, without a standard for comparison, different departments within development studios and publishing houses can have difficulty even agreeing on what the core features of their video game should be, or deciding what percent of their development effort should be spent on innovation as opposed to delivering on core genre features.

The problems extend to the investment side of gaming as well. Most game developers who are seeking funding are also in a difficult position when attempting to convince investors that they have a product which can be successful in the marketplace. Many games which could have been very successful never make it off the ground because the studios simply can't sell their ideas effectively. From the investor's perspective, there is a total lack of tools and services which with the risk of the investment can be assessed. For the most part, investors must rely on experience, instinct, intuition and a great deal of luck.

Thus, there is still a need for systems and methods in which video and other electronically embodied games can be analyzed and compared according to a features, with appropriate guidance provided to interested parties.

SUMMARY OF THE INVENTION

According to the present invention, features of audiovisual and other electronically embodied games are logically categorized, analyzed, and compared. Guidance is then preferably provided to interested parties, including for example development studios, publishers, marketing people, and investors.

In preferred embodiments, the features are organized according to a hierarchical classification scheme that is not strictly tautological. All suitable feature sets are contemplated, including, for example, feature sets corresponding to characteristics of player and non-player characters, types and/or uses of game space, and methods of rewarding a player. Relatively smaller features sets of at least 25 or 50 features are contemplated, but larger feature sets, such are 100, 250, or even 1,000 members, are considered preferable because they provide a greater level of granularity to the analysis.

In other aspects of preferred embodiments, comparisons can be made between an evaluation game and one or more sets of historically available games. Such sets can be grouped by genre and the number of games in such sets can range anywhere from a single game to hundreds of games, or more. Such set can also include successful and non-successful games, or combinations of these. Comparisons can be especially useful where an evaluation game has not yet been widely marketed, which is defined herein to mean games in which no more than 5,000 copies have been sold, excluding pre-sales, evaluations, contests and beta tests.

All commercial aspects of guidance are contemplated, including for example, providing expectations with respect to income, sales volume, one or more temporally related price points, and number of subscriptions. Guidance can additionally or alternatively include one or more of providing a risk assessment score or other risk analysis, feature assessment (prevalence), market placement, business model analysis, dynamic trend analysis, clustered pattern recognition, and image analysis.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 3A is a tree hierarchy of a portion of an exemplary classification system.

FIG. 3B is a more detailed representation of a portion of the tree hierarchy of FIG. 3A.

FIG. 4 is a portion of an exemplary set of features derived from to a hypothetical evaluation game.

FIGS. 6A-6I are exemplary reports that could be generated from the analysis of FIG. 5.

FIGS. 8A-8G are sample reports derived from analysis of historical games.

DETAILED DESCRIPTION

Figure 1:
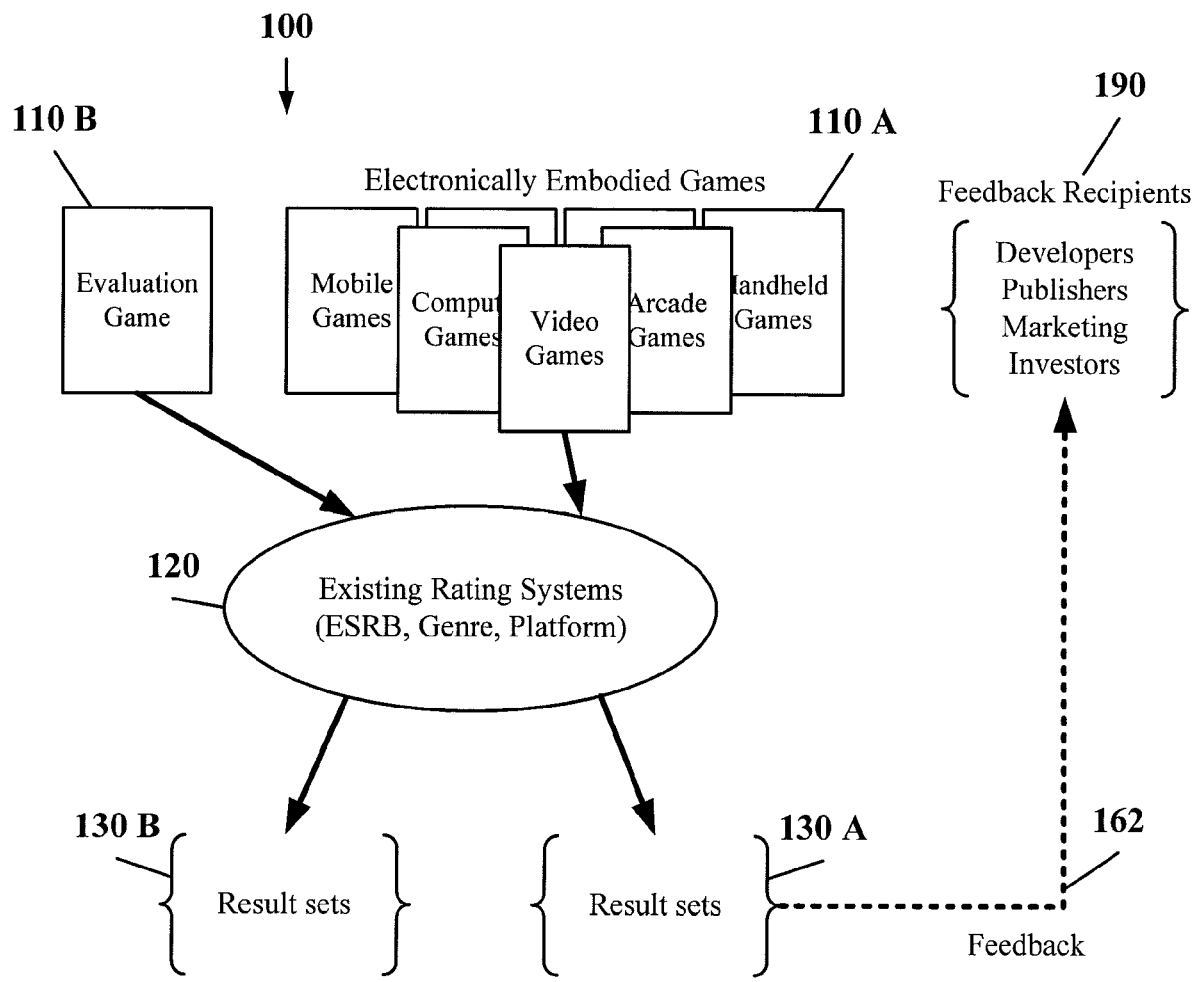
FIG. 1 is a schematic of a prior art system used to rate aspects of video games

In FIG. 1, the prior art system 100 used to rate aspects of video games generally depicts the games 110A, 110B, a rating system 120, result sets 130A, 130B, feedback loop 162 and feedback recipients 190.

Games 110A, 110B can be any electronically embodied games, which term is used herein to mean games that are, or are intended to be, marketed or used at least in part in an electronic format. In common vernacular, such games are traditionally described in terms of the hardware used to access them. This includes, for example, video games which would be games played on a game console (e.g. a PlayStation™, a Wii™, an Xbox™), computer games which are games played on a personal computer, handheld games which are games played on a hand-held gaming device other than a console (e.g. a GameBoy™, a PSP™, Nintendo™ DS™), mobile games which are games played on cell phones and other small mobile devices, web based games, which are games played through or with the aid of a web browser (e.g, Microsoft's Internet Explorer™, and Mozilla™ Firefox™), and arcade games which are games played on a large, stationary kiosk. It should be appreciated that the term "electronically embodied games" also includes games that include real-world aspects, including for example, 3-dimensional tokens, RFID and other cards, and so forth.

Rating system 120 includes any conventionally existing systems for rating electronically embodied games, whether such systems are intended for marketing or any other purposes. Exemplary conventional rating systems are ESRB, genre, platform (what hardware is the game played on,) hardware specifications (what is the minimum graphics card or processor speed that is needed to play the game), publisher, developer, internet connectivity (whether a player needs to be connected to the internet to play the game), multiplayer (whether more than 1 person play the game at the same time), etc. All of these known rating systems are quite simplistic compared with some of the inventive ratings systems described herein.

Results sets 130A, 130B are produced by the conventional rating systems 120. Results sets 130A can be used by developers, publishers, marketing personnel, investors and other recipients 190 for their specific business purposes, and other results sets 130B are used by consumers, parents, and others for consumer purposes. Such results sets 130A, 130B are entirely conventional. For example, several websites provide basic overviews of game ratings (http://gamespy.com/, http://www.gamespot.com/, and http://www.ign.com/), usually in the form of reviews of the games (e.g. "we gave it 4 of 5 stars"). Conventional ratings can also take the from of review articles, as can be seen at http://ps2.gamespy.com/playstation-2/god-of-war/, http://www.gamespot.com/ps2/action/godofwar/index.html?q=god%20of%20war, and http://ps2.ign.com/objects/661/661321.html. Simplistic platform and genre designations are also conventional, and are generally used as search filters, for example, to show only action games for the PlayStation 3. Finally, results sets are sometimes used by groups such as the ESA (Entertainment Software Association, http://www.theesa.com/) to analyze genre and market share, but these reports are not game specific. They are written about the state of the industry or the state of the genre, as opposed to analysis of specific games.

Feedback 162 to developers and other has usually been limited to individual research or canned reports. DFC Intelligence (http://www.dfcint.com/), for example, produces reports from time to time that provides analysis as to issues facing various segments of the gaming market. See http://www.gamasupra.com/php-bin/news_index.php-?story=13310.

Feedback recipients 190 are contemplated herein to include groups who can afford to do or pay for basic research. These groups involve game developers (development studios), game publishers (publishers), video game marketing and PR firms (marketing and PR), lawyers, and, recently, investment groups/fund who have been seeing video games as an emerging market worth investing in.

Figure 2:
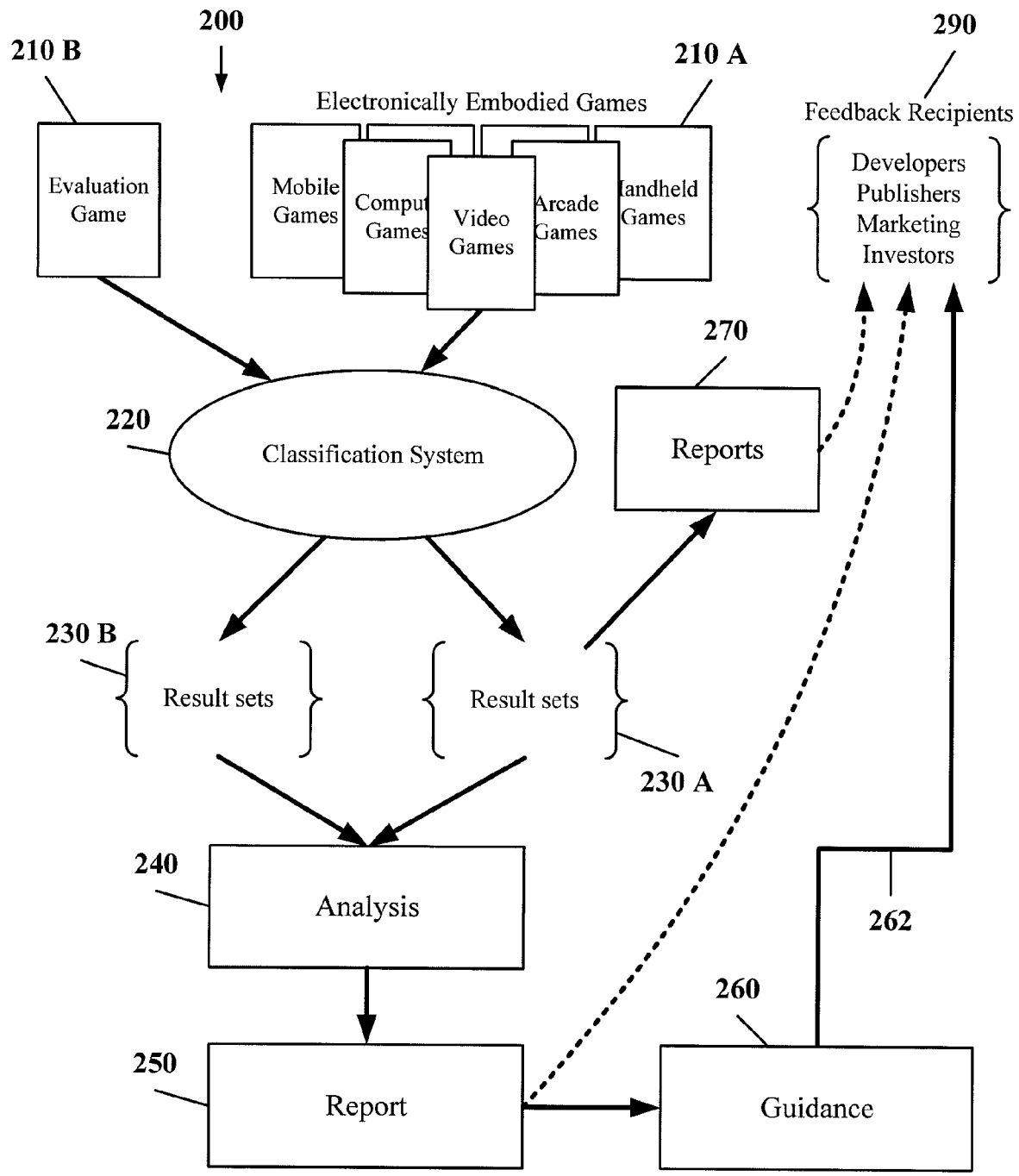
FIG. 2 is a schematic showing analysis of existing games according to a classification system, and analysis and guidance with respect to an evaluation game.

In FIG. 2, a system 200 generally comprises historically available games 210A, an evaluation game 210B, a sophisticated classification system 220, results sets 230A,B, analysis 240, reports 250, 270, and guidance 260 to feedback recipients 290.

Historically available games 210A could be the same as games 110A, but could also be a subset or superset of games 110A. There might be advantages, for example, in marketing different analyses 240 and/or reports 250, 270 at different prices, depending upon the number of historically available games considered. It is contemplated that a specific evaluation game (or set of games) could be analyzed a large set of 20, 50, 100 or even more historically available games.

Evaluation game 210B would be any game being analyzed. It is contemplated that in most instances the evaluation game 210B would be submitted by someone eliciting analysis and reporting. But in other instances a game might be evaluated for the purposes of marketing a service. Thus, some reports might be generated as a teaser to the publisher or developer of a prospective or marketed game, to generate interest in purchasing additional analysis or reports.

The classification system 220B preferably goes far beyond collecting a few features of a small set of games, and instead focuses on collecting a feature set that encompasses the breadth of all electronically games. Preferred embodiments include both broad categories (what environments does the game take place in, what is the mood and setting, what are elimination conditions for personifications), and more specific categories such as the appearance customization choices that a game player can make for their personification. In general, choice as to inclusion in the classification system revolves around deciding what might be useful knowledge for someone developing, publishing, marketing or investing in one or more game, companies in the games industry, or even companies in a related industry. It is contemplated that the classification system could change over time, possibly because the classification is insufficiently detailed (e.g., we find that we need to include hair length as well as hair style), or because a feature turns out to be irrelevant (i.e. nobody cares about hair color).

Preferred classification systems are also contemplated that go beyond merely the presence of absence of a feature. Such systems can advantageously classify the style of implementation and frequency/quantity of such features. For example, instead of merely classifying a game as having a given level of violence, preferred classification systems could qualify and/or quantify the instances of violence. Still further, systems are contemplated that classify how features interact with each other. An example would be how violence relates to weapons, use of automobiles or other transportation vehicles, or perhaps gender.

Especially preferred embodiments are hierarchical. For example, various appearance customization choices (gender, body type, clothing selection, facial appearance, hair appearance, etc) can be further broken down into attributes of that choice, (e.g. for hair appearance, one could advantageously classify the quantity and types of hairstyles available as well as the range of color choices available). A current embodiment as 81 high level classifications, but could have a greater or lesser number (e.g. 50-100) of such classifications. Embodiments are contemplated that have at least 25, at least 50, at least 100, at least 260, at least 1000 or even at least 10,000 members. Unless the context dictates to the contrary, all ranges are inclusive of their endpoints.

Especially preferred embodiments are also not strictly tautological. Thus, a given feature could easily be represented in more than one classification. For example, red hair color of a character could be classified under personal characteristics of the characters, and it could also be classified as colors used prominently in the game. Similarly, there might be sub-classifications for red, blonde, and brown hair, but no separate classification for other.

Analysis 240 is predominantly or entirely mathematical, using regression and/or other appropriate analytical tools. Analysis can compare success or other aspects of games against their own features, or against other sets of games. In the latter case, analysis is preferably made of an evaluation game against one or more relatively large sets of historically available electronically embodied games. Such sets can advantageously number at least 10, 25, 50, or 100 per genre grouping, which can include both successful and non-successful games. Of particular interest are situations in which the evaluation game has not yet been widely marketed, which is defined herein to mean games in which no more than 5,000 copies have been sold, excluding pre-sells, evaluations, contests and beta tests.

Reports 250 can be generated using the analysis 240. Such reports can either be delivered to one or more of the feedback recipients, with or without guidance 260 in interpreting the reports. Exemplary reports are shown and described herein, and include expected effects of including or excluding particular features in a game, product uniqueness, and genre suitability.

Guidance 260 can include any useful information, such as providing expectations with respect to income, sales volume, one or more temporally related price points, and number of subscriptions. Guidance can additionally or alternatively include one or more of providing a risk assessment score or other risk analysis, feature assessment (prevalence), market placement, business model analysis, dynamic trend analysis, clustered pattern recognition, and image analysis.

Reports 270 can be generated directly from the result sets of historically available games 230A. These reports do not compare a single game (evaluation game) against large groupings of historically available games, but instead compare large groupings of historically available games against each other. Exemplary reports 270 include video game trends, forecasting, genre analysis, feature analysis, etc.

FIG. 3A is a tree hierarchy of a portion of an exemplary classification system. In one aspect of preferred embodiments, the features are organized according to a hierarchical classification scheme, and more preferably according to a classification scheme that is not strictly tautological. Larger feature sets, at least 25, 50, 100, 260, or even 1,000 members are generally considered preferable to smaller feature sets.

FIG. 3B is a more detailed representation of a portion (not shown) of the tree hierarchy of FIG. 3A. All suitable feature sets are contemplated, including for example feature sets including subsets corresponding to characteristics of a personification, types and/or uses of game space, and methods of rewarding a player.

FIG. 4 is a portion of an exemplary set of features derived from a hypothetical evaluation game. To facilitate the analysis 240 and reporting 250, 270, information from evaluation games is preferably organized using the same hierarchical classification system as used for historically available games.

Figure 5:
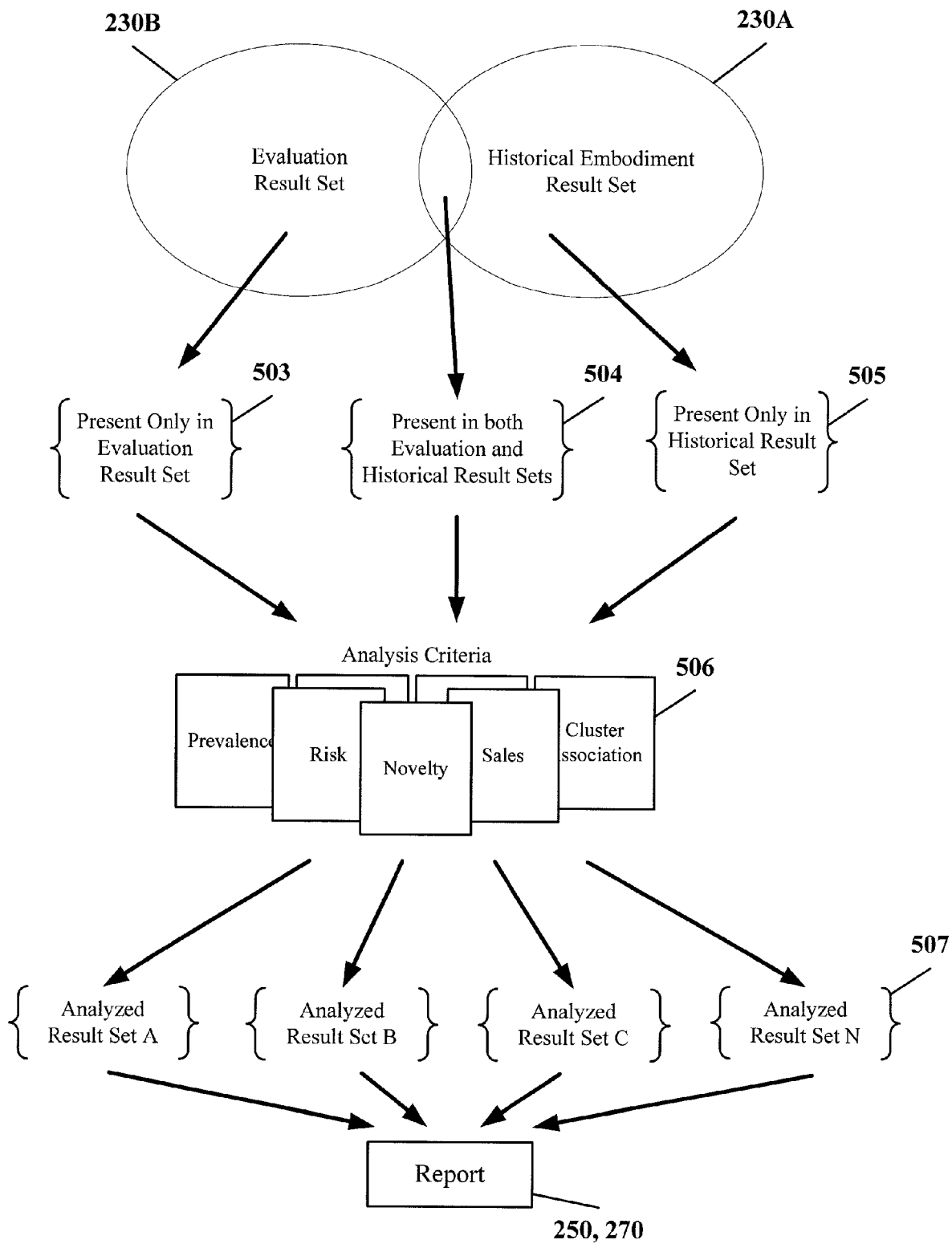
FIG. 5 is a high level perspective of steps involved in an exemplary analysis of the set of features of FIG. 4.

FIG. 5 is a high level perspective of steps involved in an exemplary analysis 240. In this particular example, the evaluation result set 230B is compared against the historical result set 230A to produce three categories of results: (1) features present only in the evaluation game 503; (2) features present in both the evaluation game and the historical data 504; and (3) features present only in the historical data 505. Once distinct sets of data have been identified 503, 504, 505, a secondary analysis of each result set is done against a number of criteria 506, depending on the final result sets desired to be created. Advantageously, this could include prevalence, risk, novelty, sales or cluster association. Most preferably it would include some or all of these in conjunction with one another for the most detailed reporting needs. After the secondary analysis 506 has been performed numerous sub result sets are produced which contain the specific data desired from the analysis 507. This data 507 is then used to generate reports 250, 270, or perhaps other reports.

Figure 6A:
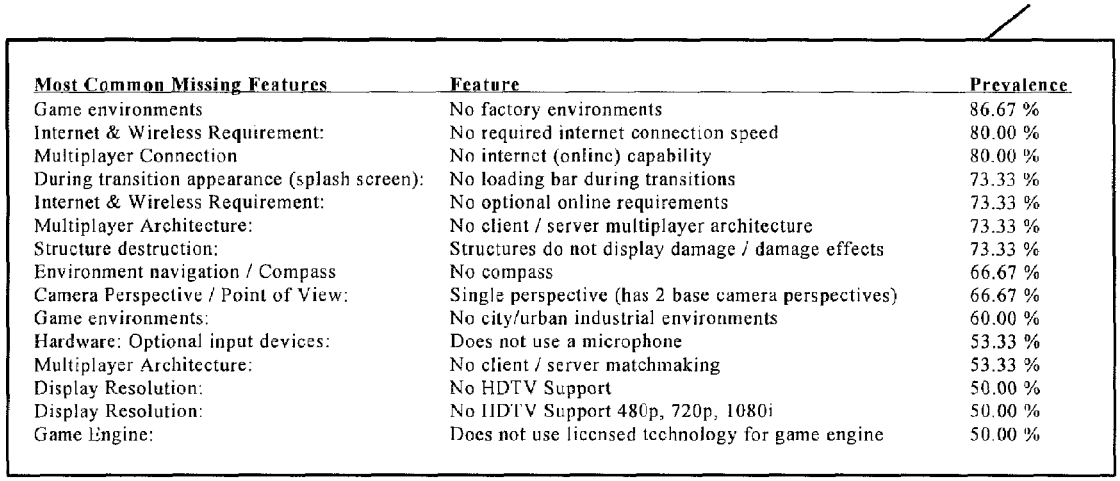

FIGS. 6A-6C are exemplary reports that could be generated from the analysis of FIG. 5.

FIG. 6A depicts an exemplary Feature Assessment (prevalence) report. Feature assessment reports are used to determine the prevalence of features in a genre or large grouping of games (as assessed from historically available games). Such reports can be used on their own, or to provide guidance for a specific game (for example, the report might show a game designer that he is missing three features that greater than eighty percent of his market competitors have, or that he implemented these features in a way that is not in accordance with market expectations. Feature assessment can also be used to determine such things as common video game features (for example, these are the 100 features that all games grossing greater than $1,000,000 had), to determine base genre features (for example, these are the 40 features that all shooter genre games grossing greater than $1,000,000 had), to determine unsuitable base genre features (for example, these are the 40 features that all shooter genre games grossing less than $200,000 had), to asses standard feature sets (for example, these are all the features of game A which X percent of other games in the same genre also had), or to asses unique features or features not commonly used by other games of the genre (for example, these are the features of game B which only Y percent of the other games in the same genre also had).

FIG. 6B provides an exemplary Risk Assessment report, in this case showing numeric risk assessment scores. Risk assessment scores are based on individual game features, or groupings/sets of such features, as well as the implementation of the feature or feature set in a particular game. For example, risk assessment scores can be a function of occurrence frequency and quantity of a given feature or feature set, and/or duration of the feature or feature set when compared to one or more sets of historically available games. The sets can preferably include any desired grouping, including for example all games in an industry, a particular platform or genre, or a subset filtered according to one or more parameters (for example, only compared to all games that grosses >$1,000, 000 dollars). These basic risk assessment scores can be supplemented by more specific risk assessment scores on a risk assessment index.

FIG. 6C shows a portion of an exemplary Market Placement report. Here, standard genre features and feature sets can be derived through analysis of historically available games.

FIG. 6D shows a portion of an exemplary Business Model Analysis report, which includes recommended and non-recommended game features. By analyzing specific evaluation games, the features of these games can be assessed to make sure that they fit the standard features of a target market. Additionally, this feature/business model type of analysis allows game designers and publishers to shift their business model to match the business model of other successful games with similar feature sets. Alternately, games can be designed to have their features match common features of other successful games of the business model they are pursuing and avoid features used by unsuccessful games of the business model they are pursuing.

FIG. 6E shows a portion of an exemplary Dynamic Trend Analysis report. By analyzing the features and sets of features of video games in accordance with their release dates, past trends in features and their prevalence can be determined. Through past trend analysis, new trends can be predicted. These trends can be filtered by one or more specific features such video game genre, video game gross sales, etc. to provide more focused trend analysis (for example, in 2000, 55% of shooter games the grossed greater than $20 million dollars had feature X, while in 2001, the same feature showed up in 75% of all shooter games grossing greater than $20 million).

Figure 6F:
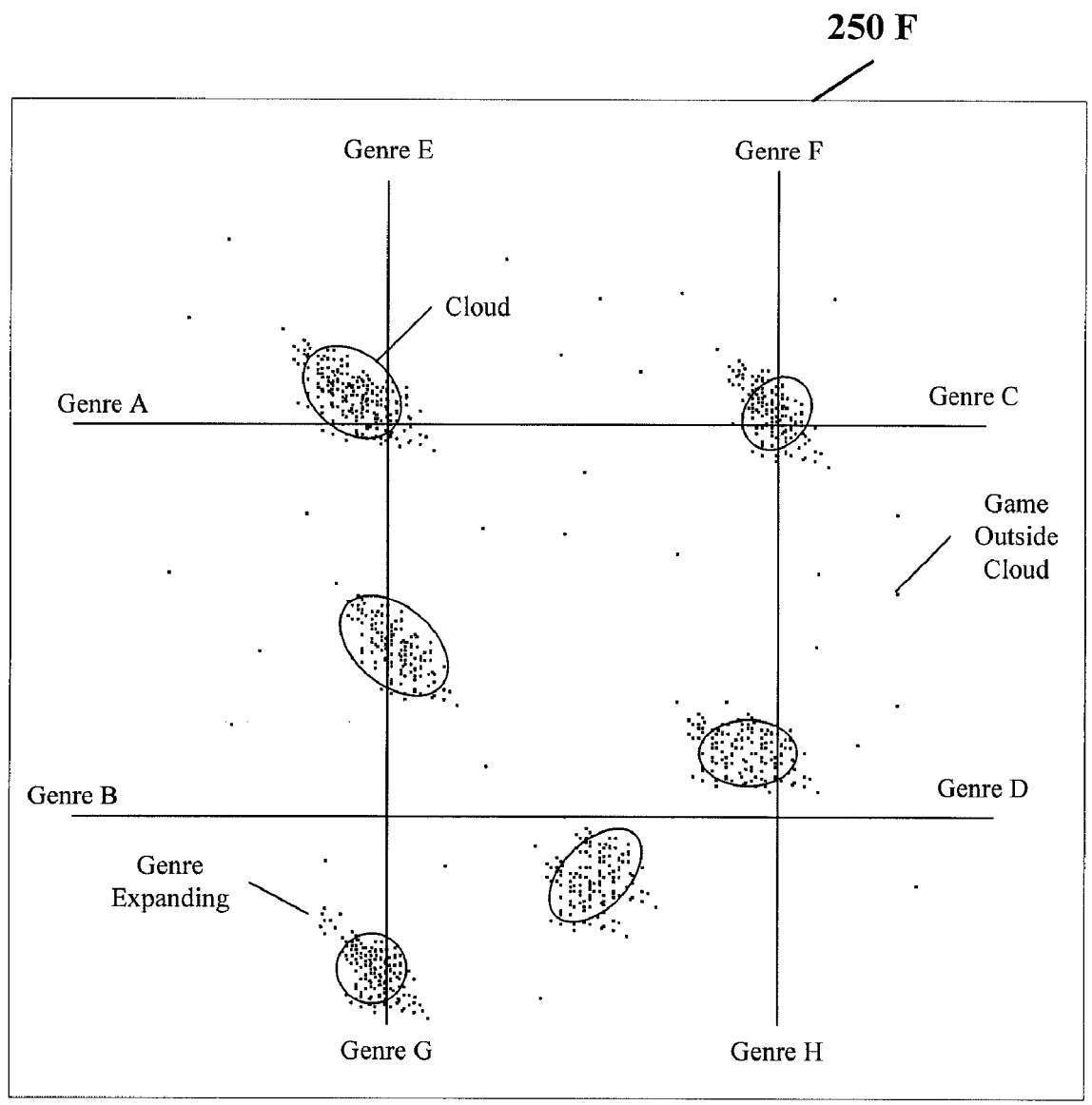

FIG. 6F shows a portion of an exemplary Clustered Pattern Recognition report; By analysis of video game features and the genres they fall into, new genres of games and new types of features can be identified based on scatter graphs and other forms of pattern recognition. Cloud reports such as FIG. 6F visually represent either: every historical game and its' overall position in relation to specified criteria (for example, Genres); or every feature and its' overall position in relation to specified criteria. A cloud graph may have as few as 2 axis end points and as many as 1000, but most preferably between 4 and 10. Cloud graphs are especially useful in visually identifying key elements, including for example:

Those games or features which are within a cloud, and therefore can be clearly identified as belonging to a specific cloud group;

Those games or features which are not within any specific cloud at all, and are therefore breakouts from any specific grouping;

Those games or features which are at the head of a cloud and could be part of a new trend to expand the cloud in a specific direction;

Those games or features which are at the tail of a cloud and could soon no longer be part of the main cloud.

It is also possible to graph a Cloud Report over time to generate multiple versions of the same cloud report but using data from segmented time periods to see how the clouds change over that period of time and to therefore predict in what direction the clouds may move in the future. By visually comparing the historical data and with a proposed game design, the cloud report can quickly identify positioning of the proposed game and its features.

FIG. 6G shows a portion of an exemplary Image Analysis Report. By analyzing pixels of an evaluation image, advantageously as promotional images related to the game, but most preferably as art used as part of the packaging of the game, including relationships between adjacent and nearby pixels and relationships of a given pixel or group of pixels as compared to the totality of the image as a whole; data on the evaluation image can be stored and compared with image data related to other historically available images. The data on the evaluation image and historically available images can also be compared with other sets of feature data related to the game that the image represented, advantageously including success or categorizing data, most preferably genre, ESRB ratings or sales, to form patterns and relationships which can identify relationships between image properties and game success or marketing targets.

Figures 6H, 6I:
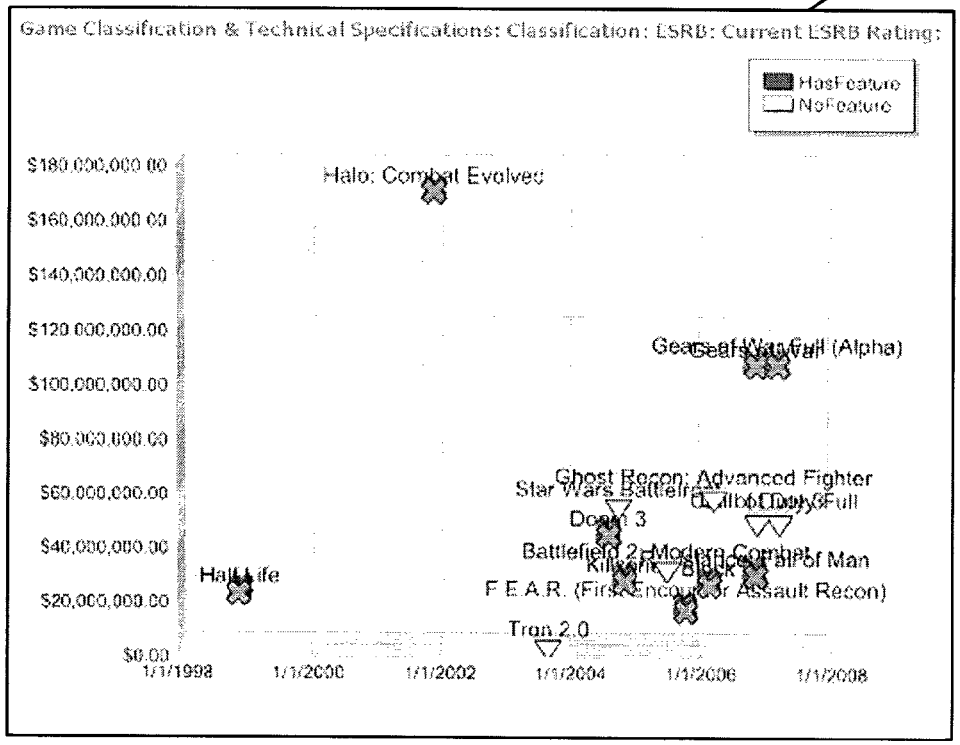

FIG. 6H shows a portion of an exemplary Feature vs. Game Income report. Here, features can be matched against game performance, as expressed by gross game income to assist determining feature suitability and game risk. Reports like this can be filtered by other features, such as game genre or release date. For example, the feature ESRB rating, filtered by game genre, could be compared against game income, showing that Teen ESRB rated shooter games are more consistent in their gross income, where Mature ESRB rated shooter games skew higher and lower on their gross incoming, including more breakaway titles but also more flops.

FIG. 6I shows a portion of an exemplary Feature Value By Genre report. Here, genres having individual features (or groups of features) are graphed against income and game release date. By analyzing individual features and sets of features of a significant quantity (5, 10, 20, 50, 100, 500+) of historically available games verses their gross incomes, the base dollar value of each feature and/or set of features can be determined. As new games are released, they can be analyzed to keep the data current, while, if necessary, old games no longer deemed relevant can be filtered out. Value of each feature or set of features can be determined for all games, or can be determined by genre (for example, feature X in genre A might be worth $20,000 in predictive sales, while the same feature X in genre B might be worth $50,000 in predictive sales).

Figure 7:
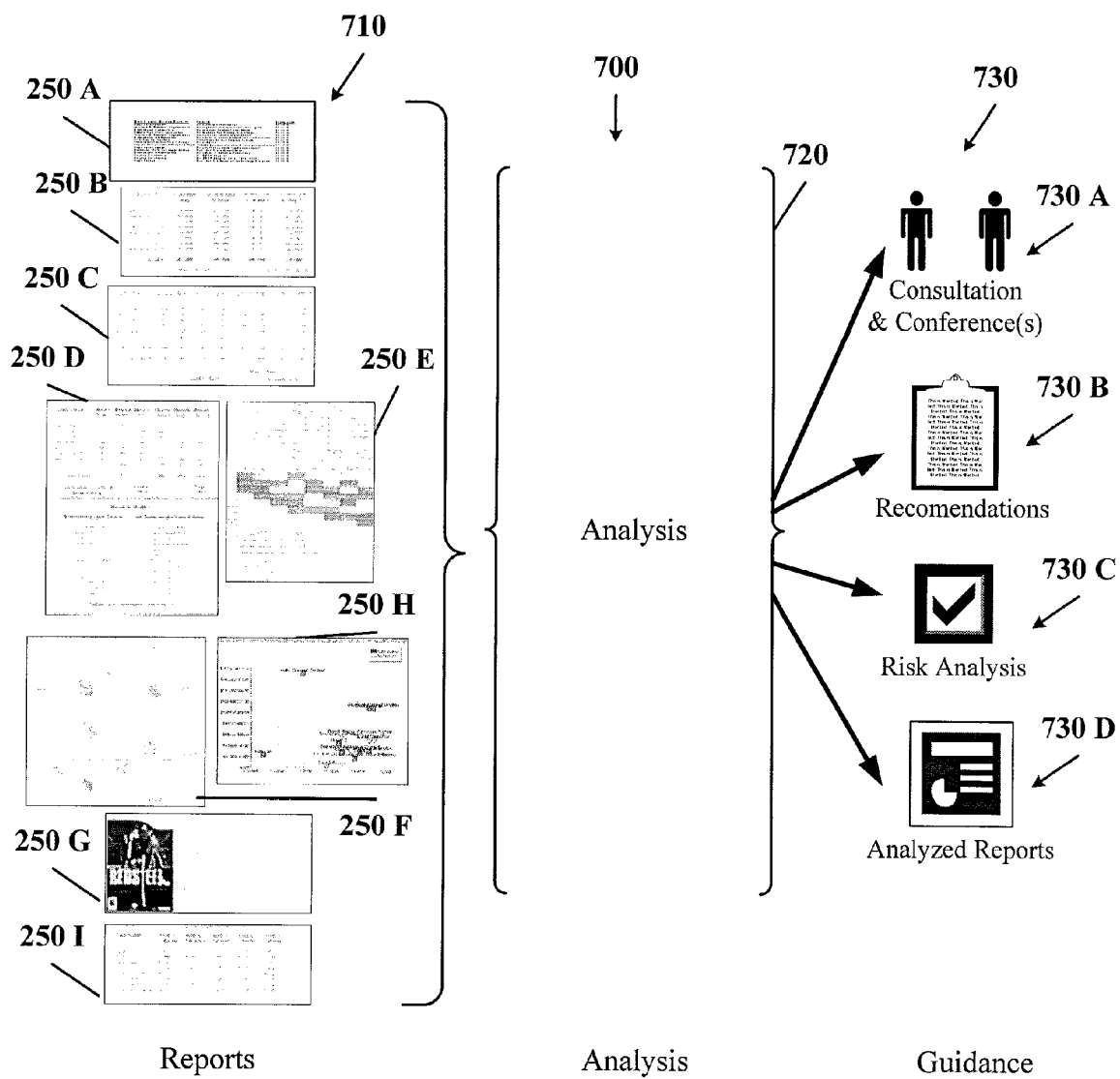
FIG. 7 is a schematic of providing guidance from the reports of FIGS. 6A-6I.
Figure 8E:
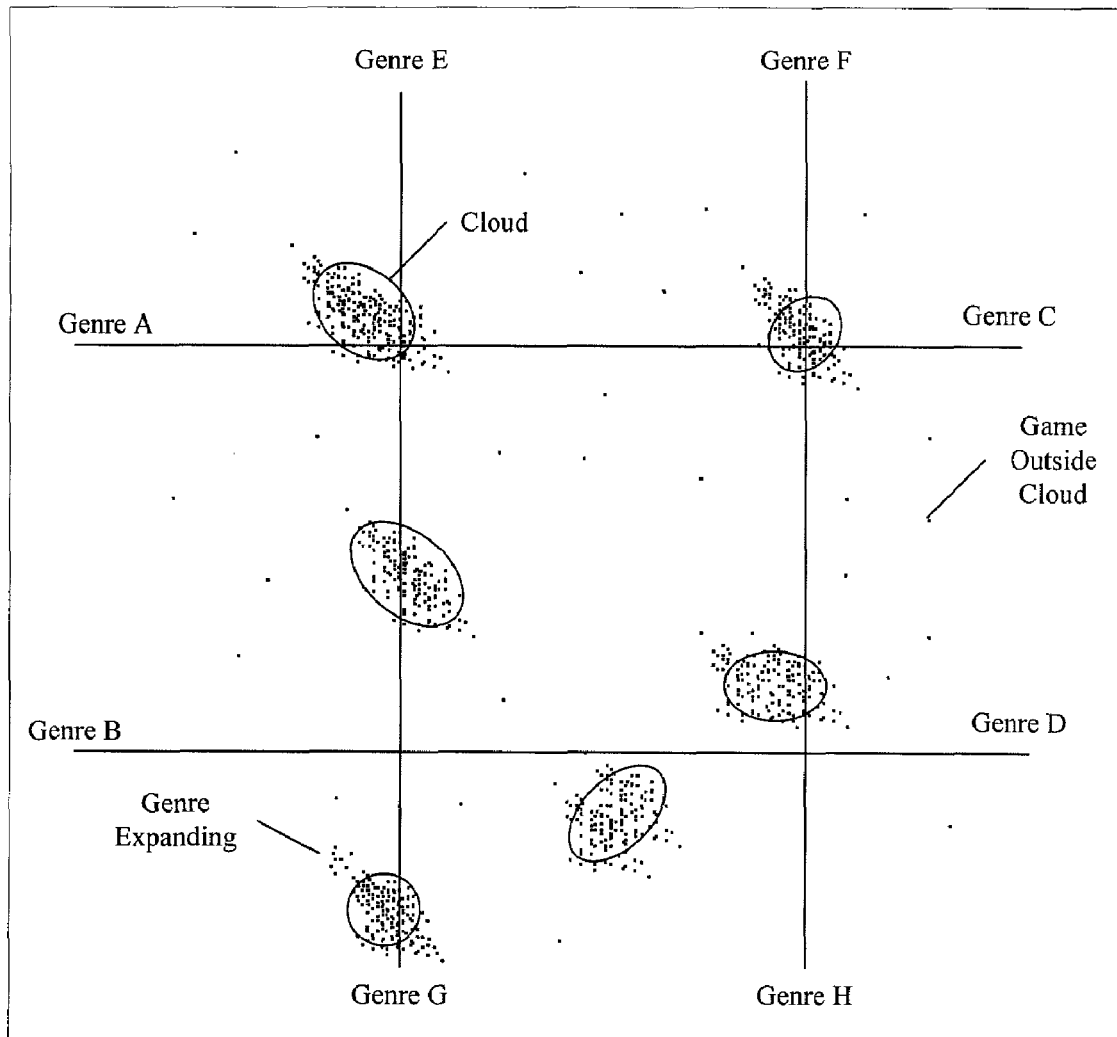
Figures 8F, 8G:
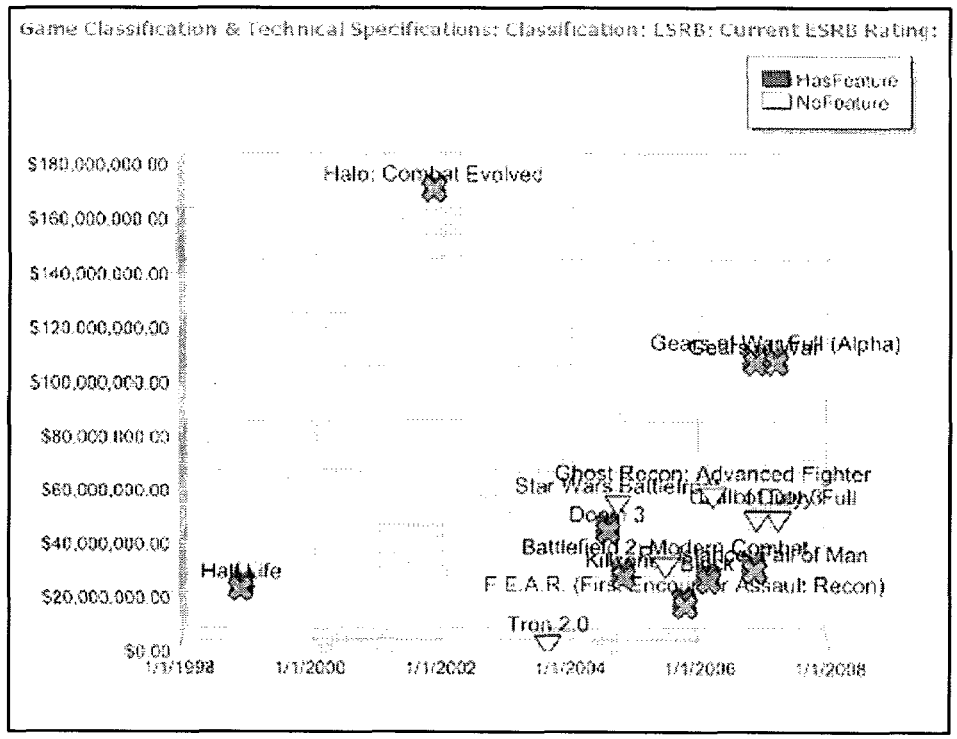

FIG. 7 is a schematic 700 depicting aspects of extending from reports 710 through an analysis 720 to provide guidance 730 to designers, publishers, marketers, investors, and possibly others. In some cased, reports 250 and 270 are given directly to feedback recipients 290. In others cases, guidance is given to the feedback recipients. In this particular instance, reports 710 include the examples of FIGS. 250A-250I, but could include additional or alternative reports (not shown).

With respect to content, all commercial aspects of guidance are contemplated, including for example, providing expectations with respect to income, sales volume, one or more temporally related price points, and number of subscriptions. Guidance can additionally or alternatively include one or more of providing a risk assessment score or other risk analysis, feature assessment prevalence, market placement, business model analysis, dynamic trend analysis, clustered pattern recognition, and image analysis.

Guidance 730 can take any suitable form, including for example:

Consultations and conferences 730A. Here, feedback recipients can receive individual consultations on the reports generated for their evaluation game or can attend conferences where they receive guidance advice/analysis of the reports and data generated from large amounts of historically available games.

Recommendations 730B. Here, feedback recipients can receive recommendations in written and/or graphic format. Recommendations make use of the analysis and suggest a course of action for the feedback recipients to take.

Risk analysis 730C. Here, feedback recipients can receive risk analysis on their evaluation game. Risk analysis can be provided in the form of a risk assessment score or other risk analysis; based on the feature sets, implementation methodology as well as feature occurrence frequency and quantity, when compared to other similar historically available games, to provide basic risk assessment or a specific risk assessment score on a risk assessment index.

Analyzed reports 740D. Here, feedback recipients can receive analyzed reports, providing both the reports with corresponding numeric, graphic and written data and analysis of the reports specific to evaluation games, genres, the industry or even specific features or groups of features.

FIGS. 8A-8G are sample reports derived from analysis of historical games. Here, there is no comparison per se, against an evaluation game. Readers will appreciate that these reports are similar to several of those in FIGS. 6A-I.

Thus, specific embodiments and applications of systems & methods for analyzing electronically embodied games have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of providing a marketing guidance report for a proposed electronic game, comprising:

providing an analysis tool comprising a processor and computer readable memory storing software instructions, where the processor is configured to derive relationships between sales data and game features upon execution of the software instructions;

collecting result set data on historical games, the result set data including sales and review data with respect to first and second historically available electronically embodied games;

collecting historical feature data on development features with respect to the historical games including a time made available, a publisher, a developer, a title, a brand, a franchise, an absence of a feature, a feature frequency, an interaction of features, and a restriction on content;

collecting additional feature data on development feature of the proposed game;

classifying the development features of the historical games and proposed game into classes according to a hierarchical classification scheme where features having common attributes are within a same class;

allowing a recipient to select at least a first feature from a first class, and a second feature from a second, different class;

allowing the recipient to select the result set data to be used for a prediction;

deriving relationships between at least the first and the second selected features with respect to the result data by using the analysis tool to run a regression analysis on the result set data, the historical feature data, and the additional feature data;

generating, using the analysis tool, the prediction with respect to the selected result set data for the proposed game having at least one of the first and the second features, wherein generating the prediction comprises a trend analysis on the relationships by using a clustered pattern recognition; and using a server to configure a remote computer to present the recipient with a marketing guidance report for the proposed game that comprises the trend analysis of the relationships with respect to the prediction of the result set data selected by the recipient.

2. The method of claim 1, wherein the classification scheme is not strictly tautological.

3. The method of claim 1, wherein the development features includes at least 100 members.

4. The method of claim 1, wherein the development features include information on a method by which a person is presented within the historical games.

5. The method of claim 1, wherein the step of running a regression analysis includes analyzing the result set data and historical feature data collected from at least 25 other historically available electronically embodied games.

6. The method of claim 1, wherein the steps of collecting historical feature data include collecting data from a review article.

7. The method of claim 1, wherein the development features include at least one of the following a design theory and an implementation.

8. The method of claim 1, wherein at least one of the historical games is regarded as having been commercially unsuccessful.

9. The method of claim 1, wherein the proposed game has not yet been widely marketed.

10. The method of claim 1, wherein the recipient comprises an investor.

11. The method of claim 1, wherein the report comprises a successfulness risk analysis.

12. The method of claim 1, wherein the report comprises a feature assessment.

13. The method of claim 1, wherein the report comprises a market placement analysis.

14. The method of claim 1, wherein the report comprises a dynamic trend analysis.

15. The method of claim 1, wherein the report comprises a filtered subset of the development features.

16. The method of claim 1, wherein the report comprises a cloud graph.

17. The method of claim 1, wherein the report comprises an image analysis.

* * * * *